United States Patent [19]

Brog

[11] 4,397,927

[45] * Aug. 9, 1983

[54] IMITATION MILK COMPOSITIONS AND AQUEOUS DISPERSIONS PREPARED THEREFROM

[76] Inventor: Roy A. Brog, 1600 N. Main St., Logan, Utah 84321

[*] Notice: The portion of the term of this patent subsequent to Jun. 29, 1999, has been disclaimed.

[21] Appl. No.: 361,761

[22] Filed: Mar. 25, 1982

[51] Int. Cl.³ .................................................. A23C 11/04
[52] U.S. Cl. .................................. 426/583; 426/584; 426/585; 426/590
[58] Field of Search ............... 426/580, 583, 585, 588, 426/590, 801, 584

[56] References Cited

U.S. PATENT DOCUMENTS

| | | | |
|---|---|---|---|
| 746,502 | 12/1903 | Hall | 426/585 |
| 2,604,403 | 7/1952 | Wiechers | 426/585 X |
| 2,923,628 | 2/1960 | Otto | 426/580 X |
| 3,560,220 | 2/1971 | Bangert et al. | 426/589 X |
| 3,642,492 | 2/1972 | Arndt | 426/583 |
| 3,642,493 | 2/1972 | Arndt | 426/583 |
| 3,896,240 | 7/1975 | Gruette et al. | 426/583 X |
| 3,911,143 | 10/1975 | Colmey et al. | 426/583 |
| 3,943,264 | 3/1976 | Davis | 426/583 X |
| 4,031,261 | 6/1977 | Durst | 426/580 X |
| 4,269,864 | 5/1981 | Chirafisi et al. | 426/580 X |
| 4,309,417 | 1/1982 | Staples | 426/583 X |
| 4,337,278 | 6/1982 | Brog | 426/588 X |

*Primary Examiner*—Arthur L. Corbin
*Attorney, Agent, or Firm*—Thorpe, North & Western

[57] ABSTRACT

New imitation milk compositions which can be easily dispersed in water to form milk-like beverages having improved properties, such as improved color, body and flavor, are prepared by mixing a major portion of a sweet whey base with lesser amounts of a soluble casein salt, an edible animal fat, with or without an added vegetable fat, an added sugar or artificial sweetener, and preferably a minor amount of nonfat dry milk solids, the weight ratio of water soluble casein salt to protein in the whey and the weight ratio of sugar to the lactose in the whey varying within certain specific limits. Aqueous dispersions, imitating low-fat, skim and whole milk imitation beverages, obtained by dispersing the new compositions in water, are also provided.

20 Claims, No Drawings

IMITATION MILK COMPOSITIONS AND AQUEOUS DISPERSIONS PREPARED THEREFROM

BACKGROUND OF THE INVENTION

1. Field of the Invention

This invention relates to new and improved imitation milk compositions and dispersions prepared therefrom. More particularly, the invention relates to new imitation milk compositions having a whey base which can be easily dispersed in water to form milk-like beverages which simulate the flavor and texture of cow's milk.

Specifically, the invention provides new imitation milk compositions having improved properties, particularly in the ability to form milk-like beverages having improved color, body and flavor. The new compositions of the present invention have a solids content comprising a major portion of a sweet whey base combined with lesser amounts of a soluble casein salt, an edible animal fat, an added sugar or artificial sweetener, and preferably a minor amount of nonfat dry milk solids, the weight ratio of water soluble casein salt to protein in the whey varying from about 0.8:1 to 1.2:1, and the weight ratio of added sugar to the lactose in the whey varying from about 0.3:1 to 1:1. Other additives such as stabilizers, emulsifiers, gums, flavors, vitamins, minerals, etc. as desired may also be added to the new compositions. Certain beneficial enzymes and bacteria may also be added.

The invention further provides liquid dispersions, such as low-fat, skim and whole milk imitation beverages, such as may be obtained by dispersing the aforementioned imitation milk compositions in water.

2. Prior Art

Whey is broadly defined as the by-product obtained from the manufacture of cheese. Sweet whey is obtained from the manufacture of swiss, mozzarella, monterey jack, cheddar and similar types of cheese resulting from the action of rennin, pepsin or vegetable derived enzymes on casein. The principal components of whey are milk sugar (lactose) and soluble milk protein (lactalbumin). Milk salts which contain calcium, sodium, potassium and phosphate ions are also present as are minor amounts of fat. Demineralized or partially demineralized wheys may also be used. The cheese from which whey is a by-product consists almost entirely of precipitated milk fat and protein (casein).

Of the milk proteins, casein is much more prevalent in milk than lactalbumin, e.g., from three to five times as great. When fat and casein have been removed during the cheese making process, essentially all of the remaining milk ingredients remain in the whey. Liquid whey consists of only about 7 percent by weight solids with the remainder being water. The whey solids are extracted from this watery base and dried before being used in this invention.

Many authorities of nutrition have recognized the value of whey solids which consist of about 10 to 14 percent protein (primarily lactalbumin), 70 to 75 percent lactose, 7 to 10 percent salts, 0 to 1 percent fat with some enzymes and vitamins, the remainder being moisture. Demineralized wheys contain less salts. Athletes and consumers of health foods use whey-based powders and products and claim to derive curative, nutritional and health protective benefits. However, products based on whey, and beverages in particular, are unpalatable to humans because of the taste imparted by the whey. As a result, this product is relatively inexpensive and is used primarily as an animal feed or dumped as a waste product creating disposal problems.

Some attempts have been made to provide a synthetic milk utilizing whey solids. U.S. Pat. No. 2,923,628 which issued Feb. 2, 1960 teaches a combination of whey solids with lecithin and safflower seed oil and other minor ingredients.

A more recent patent relating to a simulated milk product containing whey solids is U.S. Pat. No. 3,642,493 which issued Feb. 15, 1972. This patent claims a combination of whey along with isolated vegetable protein and vegetable oil wherein the proportions of vegetable protein, vegetable oil and whey are in the same range as the casein, butter fat and whey that are in whole milk. A special process step is required to prepare the protein.

Whey solids have also been incorporated into such edible compositions as garnishes, toppings, and dressings of the sour cream type as taught in U.S. Pat. No. 3,560,220 which issued Feb. 2, 1971. Acid whey solids, such as obtained from cottage cheese manufacture, are used with an animal or vegetable fat being the major ingredient.

U.S. Pat. No. 3,560,220 also mentions the use of water soluble casein, i.e., sodium caseinate. This product is manufactured from casein by treating it with sodium hydroxide. The sodium caseinate salt thus obtained is generally considered as a "non-dairy" product and contains from about 0.3 to 3.0 percent by weight sodium ions.

Sodium caseinate, vegetable oils and an added carbohydrate are the basic ingredients of "non-dairy" creamers such as taught in U.S. Pat. No. 4,046,926 which issued Sept. 6, 1977, but are not generally drinkable for beverage purposes because of the high fat content used to provide the creamy texture.

Although sodium caseinate and whey have been used in food products, they have not, heretofore, been used together to provide a palatable simulated milk beverage. Each of these products is derived from milk but is considered to be a milk by-product and is often classified as being "non-dairy". Their use together has only been considered suitable as a substitute for non-fat milk solids in chemically leavened baked goods such as is taught in U.S. Pat. No. 3,943,264 which issued Mar. 9, 1976. Such a product is marketed by Kraft, Inc. of Memphis, Tennessee as a non-fat milk "alternate" under the registered trademark Cake Classic.

OBJECTS OF THE INVENTION

It is an object of the present invention to provide new imitation milk compositions which can be used to prepare palatable milk-like beverages simulating the flavor and texture of cow's milk. It is a further object to provide a new and improved imitation milk composition having a whey base which can be used to form valuable milk-like beverages. It is a further object to provide an imitation milk containing a protein which is a mixture of dairy derived by-products consisting of a processed soluble casein salt and whey protein in a substantially equal weight ratio. It is a further object to provide an imitation milk having a whey base combined with non-dairy products which simulates the flavor and texture of milk and which can be utilized as a powder or as a reconstituted liquid. It is a further object to provide a new imitation milk composition based on whey which can be dispersed in water to form a beverage which has excellent color, body and texture, as compared to previously prepared imitation milk compositions. These and other objects will be apparent from the following detailed description thereof.

SUMMARY OF THE INVENTION

It has now been discovered that these and other objects can be accomplished by the new imitation milk compositions of the present invention having a solids content consisting of a major portion of a sweet whey to which has been added a balanced amount of a soluble casein salt, animal fat or a mixture of animal and vegetable fats and an added sugar or artifical sweetener, and preferably a minor amount of nonfat dry milk solids, the weight ratio of water soluble casein salt to protein in the whey varying from about 0.8:1 to 1.2:1, and the weight ratio of sugar to the lactose in the whey varying from about 0.3:1 to 1:1. By balanced amount is meant the amount of soluble casein salt, animal fat or mixture of animal and vegetable fats and sweetener which must be added to the whey solids to provide a palatable product which contains all of the nutrients found in bovine milk although in different ratios. The product may be used in either a dry or liquid state and has the appearance and texture of milk.

The balance between the whey proteins, i.e., lactalbumin and lactoglobulin, and soluble casein salt, i.e., sodium caseinate, has been found to be a primary factor in contributing to the palatability of the product as will be hereinafter detailed. The combination of the lactose, from the whey, with other sugars or artificial sweetener sources is also of importance in balancing the flavor and taste of the product.

It has also been found that the presence of an animal fat, with or without vegetable fats, provides unexpected improvement, particularly as to color, body and flavor of the imitation milk products prepared therefrom. They are improved in these areas as compared to the new imitation products disclosed and claimed in my U.S. Pat. No. 4,337,278 which issued June 29, 1982.

The new imitation milk compositions of the present invention also preferably contain a minor portion of nonfat dry milk solids and thus provide improvement in the texture and balance of the finished imitation milk products.

The new imitation milk products obtained by dispersing the new compositions noted above in water, such as the hereinafter described nonfat milk, skim milk and whole imitation milk beverages, not only simulate the color, flavor and consistency of milk but are considerably less expensive to produce.

DETAILED DESCRIPTION OF THE INVENTION

The new imitation milk compositions of the present invention are prepared by admixing the four basic components, i.e., (1) sweet whey solids, (2) soluble casein salt, (3) a sugar or artificial sweetner, and (4) animal fat, or a mixture of animal and vegetable fats, to provide a simulated milk product containing carbohydrates, proteins, fats and minerals as nutrients.

One basic difference between the imitation milk product of the invention and bovine milk is that the ratios of carbohydrate and protein are somewhat altered although the taste and texture are similar. The carbohydrate content is higher and the protein is lower for the imitation milk as compared to cow's milk. All product ingredients will be reported as a weight ratio or percent by weight based on a simulated imitation milk powder or solids. The powder can be diluted with water to provide a fluid imitation milk or can be used directly in any application as a substitute for powdered milk.

The protein content of the imitation milk is a mixture of proteins derived from milk by-products. The processing of milk to obtain casein and the subsequent treatment of casein to form a soluble caseinate are both well known procedures. Sodium and calcium caseinate are commercial products.

Also, the processing of whey to obtain whey solids is known and whey powder is commercially available. Typically, whey solids contain from about 10 to 14 percent by weight protein. This protein is primarily lactalbumin with some lactoglobulin also being present.

By mixing a soluble caseinate salt with the whey in a weight ratio such that the ratio of caseinate to whey protein is from about 0.8:1 to 1.2:1 it has been found that the objectionable flavor associated with whey is effectively neutralized. Moreover, the protein efficiency ratio (PER) is greater than that of cow's milk. Just why the approximately equal ratios of caseinate salts with whey protein renders a whey based mixture palatable is not known. In milk, from which no protein has been removed, the ratio of casein to other milk proteins is about 4:1. In other words, about 80 percent by weight of milk protein is casein.

The imitation milk powder will have a protein content of about 10 to 18 percent by weight. In order to prepare such a product, the sweet whey solids will make up approximately 40 to 60 percent by weight of the imitation milk, and the soluble casein salt, preferably sodium caseinate, will be present in amounts ranging from about 4 to 10 percent. The sodium caseinate not only helps to neutralize the whey flavor, but also adds a white color to the mixture. Moreover, the sodium caseinate, being waer soluble, also provides stability to a fluid suspension of the imitation milk blend when admixed with water.

Any off flavor from the whey remaining after admixing the aforementioned ratios of soluble casein salt with whey solids can be essentially completely overcome by the addition of a sugar separate from the lactose contained in the whey. However, the usage of added purified or refined lactose is not to be precluded. Any of the conventional commercially available sugars such as sucrose, fructose, dextrose or glucose may be utilized. In theory, any of the mono- or disaccharides derived from the hexoses such as glucose, fructose, galactose, mannose, sucrose, maltose and lactose may be used.

It may be beneficial to use a combination of simple and more complex sugars instead of just mono- and disaccharides. More complex sugars or simple starches such as oligosaccharides and polysaccharides may be substituted for a portion of the simple sugars. Such complex sugars include tetrasaccharides and dextrins. The more complex sugars are metabolized more slowly than the simple sugars and thus provide for more balanced carbohydrate metabolism in the body of one consuming the product. A preferred sugar combination is corn syrup solids which, when combined with the lactose from the whey, provides a carbohydrate containing about 3 percent of monosaccharides (glucose), 65 percent of disaccharides (lactose, maltose) and 32 percent of oligosaccharides and polysaccharides (tetrasaccharides, dextrins, etc.). Thus, the term sugar as used herein is deemed to include complex as well as simple sugars.

In the alternative, a synthetic sweetener such as saccharin or cyclamate salts having the sweetening power equivalent to the amount of sugar which would normally be added may be used in the place of sugar.

While the amount of added sugar is somewhat limited by the requirements of the other ingredients, it has been found that the ratio of added sugar to the lactose from the whey should be at least 0.3:1 and may be considerably higher. Ratios as high as 1:1 may be utilized; however, the preferred ratio is from about 0.6:1 to 0.8:1. The overall sugar content, i.e., whey sugar plus added sugar, will generally vary from about 40 to 80 percent by weight of the total imitation milk composition with the added sugar comprising 10 to 40 percent.

The animal fat used in the compositions of the present invention may be obtained from a variety of sources. The fats may be edible portions obtained from fishes, bird or land animals, and may be obtained from fat deposits in the body or derived from fluids prepared by the animals, such as the animal milk fats. Preferred animal fats are those derived from land animals, and still more preferably those solid or semi-solid fats containing a large amount of triglycerides of $C_{16}$ to $C_{18}$ fatty acids. Coming under special consideration are those animal fats containing from 30 to 38 percent $C_{16}$ acids and 60 to 70 percent $C_{18}$ acids. Acids contained in the triglycerides include, among others, palmitic, hexadecenoic acid, oleic acid, stearic and linoleic acid. Saturated fats contain mainly stearic and oleic acid, and unsaturated fats contain mainly oleic and linoleic acid. The stearic-rich animal fats contain up to 60 percent of saturated acids. Butter or milk fat from cow's milk is particularly preferred.

The amount of animal fat added to the compositions of the invention may vary depending upon the type of product desired. Low-fat milk compositions generally contain from about 0.5 to 2 percent fat, while the skim milk may contain 0.5 percent or less of the fat. Imitation milk compositions which may be used to prepare whole milk substitutes may contain 3 percent or more fat. In order to add an adequate amount of fat to prepare a powder which can be diluted to a skim, low-fat or whole imitation milk, the fat content of the powder product may preferably vary from about 0.5 percent to about 35 percent, and still more preferably from about 3 percent to about 30 percent by weight.

A more detailed description of the animal fats that may be used in the compositions of the invention may be found in "An Introduction to the Chemistry and Biochemistry of Fatty Acids and Their Glycerides," Gunstone, 2d Ed. 1976, particularly page 152 to 155.

In some cases it may be desirable to replace part of the animal fat with an edible vegetable oil, which is free of cholesterol. Any such edible vegetable oil may be used. Oils which have been found to be particularly useful in providing proper color and texture to the imitation milk product are partially hydrogenated coconut and soy oils or mixtures of the two. The amount of the animal fat that may be replaced with the vegetable oil is preferably below about 75 percent, and still more preferably from about 5 percent to about 50 percent by weight.

As noted above, it is highly desirable to include a minor portion of nonfat dry milk solids in the new compositions of the present invention. Such addition improves the texture and balance of the resulting imitation milk compositions. The amount of these solids to be employed may vary over a considerable range, but generally will range from about 3 percent to about 35 percent by weight. Particularly preferred ranges vary from about 3 percent to about 15 percent by weight. The main essential ingredients of the nonfat milk solids include carbohydrates (e.g., lactose), protein, fat and minerals. Other components include Vitamin A, pantothenic acid, riboflavin, thiamin, niacin, and minerals such as phosphorous, potassium, sodium and iron. Particularly preferred nonfat solids to be used are those containing from 50 to 55 percent carbohydrates, chiefly as lactose, 30 to 38 percent protein, 0.5 to 1.5 percent fat and 6 to 10 percent minerals. A method for preparing the nonfat dry milk solids can be found in Hall, et al., "Drying of Milk and Milk Products," AVI Publishing Co., 1971.

The whey solids and nonfat milk solids, if present, contribute almost all of the inorganic matter found in the final product. Calcium is the predominant mineral; however, potassium, sodium and magnesium are also found to be present in varying degrees. Trace amounts of iron and copper may also be present. Phosphorous and chlorine are also present as inorganic constituents. Overall, the inorganic content of the imitation milk product will generally vary somewhere between about 2 percent to about 10 percent.

Other ingredients which generally will comprise not more than 1 percent and preferably between about 0.5 and 1.0 percent by weight of the imitation milk product may also be compounded with the above ingredients. Stabilizers, emulsifying agents, thickening agents, wetting agents and the like may be added to promote the dispersibility and suspendability of the various components. Typical of such ingredients are dipotassium and calcium phosphates, carrogeenan, lecithin, guar gum, xanthan gum, cellulose ethers, gelatin and the like. Calcium lactate or sulfate may be added as calcium builders. Vitamin A and D, which are generally added to fortify milk, may also be added. Flavoring agents may be utilized as desired. For example, it may be desirable to add chocolate and added sugar to provide an imitation chocolate milk. Beneficial enzymes and bacteria may also be added if desired.

The product may also contain buffers to maintain the pH of the product within the optimum range of 6.7 to 7.1. However, the pH may vary from about 6 to 7.5 without any appreciable loss in flavor. Appropriate pH's may be obtained by the addition of minor amounts of a hydroxide or carbonate as the product will generally be adjusted from a more acid pH to a more basic one.

The product is preferably prepared in a two-step process. First, the sodium caseinate, fat, sugar and nonfat dry milk solids and other additives are dry blended together and thoroughly mixed. The mixed ingredients are then dry blended with the whey solids.

The blended powders may be treated by agglomeration to increase their wettability and dispersability, thereby producing an "instant" imitation dry milk.

In the alternative, an aqueous solution of the blended ingredients may be spray-dried to provide a powdered product which will be readily reconstituted to form a fluid imitation milk.

The product may also be made and distributed in fluid form having a water content of 89 to 92 percent by weight and a solids content of 8 to 11 percent by weight. As a fluid it may be subjected to homogenization and pasteurization in the same manner as fluid milk. In some instances, it may be advantageous to homogenize and pasteurize a fluid product followed by spray or flash drying to obtain a powdered product.

The imitation milk has excellent storage capabilities in powdered form and has a shelf life as a liquid product equal to or exceeding its fluid milk counterpart.

The products of the present invention have numerous medical advantages over bovine milk in certain applications. University research has shown that whole cow's milk contains eleven different antigens which may cause milk allergies when consumed. When the product of the present invention was tested in the same research study, it was found to contain only five antigens. Whole cow's milk also contains a substance referred to as xanthine oxidase which has been found to contribute to cardiovascular diseases. A University research study shows that the xanthine oxidase content of the present invention was from 21 to 30 times lower than whole milk.

To illustrate the new products of the invention, the following examples are given. It is to be understood, however, that the examples are given in the way of illustration and not to be regarded as limiting the invention in any way.

EXAMPLE I

This example illustrates the preparation of a low-fat imitation milk composition containing butter fat derived from cow's milk fat containing as major triglycerides those containing 10 percent $C_4$ to $C_{10}$ saturated fatty acids, 10% $C_{14}$ saturated fatty acids, 35 percent $C_{16}$ saturated fatty acids, 10 percent $C_{18}$ saturated fatty acids and 30 percent $C_{18}$ unsaturated fatty acids.

A dry blend was made by combining 6.5 parts by weight sodium caseinate with 27 parts by weight corn syrup solids. To this mixture was added 17 parts by weight of butter fat and 1 part by weight stabilizer and flavoring. This product was thoroughly mixed in a ribbon blender. To the above product was blended 48.5 parts by weight whey solids containing 37 parts by weight lactose, 6.5 parts by weight protein and 5 parts by weight minerals.

EXAMPLE II

This example illustrates the preparation of a milk-like beverage from the new imitation milk composition described in Example I.

The prouct of Example I was reconstituted in water by mixing 12 ounces of powder in water to make one gallon. The product was mixed in water at about 125° F., homogenized, pasteurized and then allowed to chill to about 40° F. The imitation milk beverage contained about 100 calories per 8 ounce cup and had 3 grams protein, 14 grams carbohydrate and 4 grams fat per serving.

When compared to the low fat imitation milk beverage produced in Example I of U.S. Pat. No. 4,337,278 the imitation milk of this example possessed a distinctive color and body and had a different but pleasing flavor.

EXAMPLE III

This example illustrates the preparation of an imitation skim milk compositon according to the present invention.

A dry blend was prepared as in Example I with the following composition:

| Ingredients | Parts by Weight |
|---|---|
| Sodium Caseinate | 7.5 |
| Corn Syrup Solids | 31.3 |
| Butter Fat | 5.0 |
| Additives | 1.0 |
| Whey Solids | 55.2 |
| (Lactose) | (42.7) |
| (Protein) | (7.5) |
| (Minerals) | (6.0) |

Following the procedure of Example II, 10.5 ounces of powdered product was dissolved in water and diluted to one gallon. The imitation milk contained 3 grams of protein, 14 grams of carbohydrate and 1 gram of fat per 8 ounce serving.

EXAMPLE IV

This example illustrates the preparation of an imitation whole milk composition according to the present invention.

A dry blend was again prepared as in Example I having the following composition:

| Ingredient | Parts by Weight |
|---|---|
| Sodium Caseinate | 5.5 |
| Cane Sugar | 22.5 |
| Butter Fat | 30.0 |
| Additives | 1.0 |
| Whey Solids | 41.0 |
| (Lactose) | (31.5) |
| (Protein) | (5.5) |
| (Minerals) | (4.0) |

Following the procedure of Example II, 14.25 ounces of powdered product was dissolved in water and diluted to one gallon. The imitation milk contained 3 grams of protein, 41 grams of carbohydrate and 8 grams of fat per 8 ounce serving.

EXAMPLE V

This example illustrates the preparation of an imitation low-fat chocolate milk according to the present invention.

To 12 ounces of the dry product of Example I was blended 5.3 ounces of a commercial sugar chocolate blend and 0.12 ounces of a xanthan gum stabilizer in a ribbon blender. The blended product was diluted with water to one gallon and was found to have excellent taste and stability when being utilized in a hot or cold beverage.

EXAMPLE VI

This example illustrates the preparation of an imitation low-fat milk composition according to the present invention which also contains nonfat dry milk solids.

A dry blend was made by combining 6.0 parts by weight of sodium caseinate with 25.2 parts by weight of corn syrup solids and 9 parts by weight of nonfat dry milk solids. To this mixture was added 15.8 parts by weight of butter fat and 1 part by weight stabilizer and flavoring. This product was thoroughly mixed in a ribbon blender. To the above product was blended 43 parts by weight whey solids containing 32.7 parts by weight lactose, 5.6 parts by weight protein and 4.7 parts by weight minerals and inorganics.

The product prepared above was diluted with water by mixing 12 ounces of powder to provide one gallon of reconstituted product. The product was mixed in water at about 125° F. homogenized, pasteurized and then allowed to chill to about 40° F. The imitation milk beverage contained about 100 calories per 8 ounce cup.

EXAMPLE VII

Examples I to VI are repeated with the exception that the butter fat is replaced by an equal weight of the following:

(a) lard (b) equal mixtures of butter fat and coconut oil. Related results are obtained.

What is claimed is:

1. An imitation milk composition having a solids content consisting essentially of 40 to 60 percent by weight sweet whey solids, 4 to 10 percent by weight of a water-soluble casein salt, 10 to 40 percent by weight of an added sugar, 0.5 to 35 percent by weight of an edible animal fat or a mixture of edible animal and vegetable fats, and 0 to 35 percent by weight of non-fat dry milk solids, wherein the weight ratio of water-soluble casein salt to the protein in the whey may vary from about 0.8:1 to 1.2:1 and wherein the weight ratio of sugar to the lactose in the whey may vary from about 0.3:1 to 1:1.

2. An imitation milk composition according to claim 1 wherein the water-soluble casein salt is sodium caseinate.

3. An imitation milk composition according to claim 1 wherein the fat is an edible animal fat of a land animal consisting essentially of triglycerides of $C_{16}$ to $C_{18}$ fatty acids.

4. An imitation milk composition according to claim 1 wherein the sugar is corn syrup solids.

5. An imitation milk composition as in claim 1 wherein the nonfat dry milk solids are present in an amount of between about 3.0 to 15 percent by weight.

6. An imitation milk composition as in claim 5 wherein the nonfat dry milk solids consist essentially of 50 to 54 percent carbohydrates, 30 to 35 percent proteins, 5 to 1.5 percent milk fat and 7 to 10 percent minerals, the total adding up to 100 percent.

7. An imitation milk composition according to claim 1 wherein the product additionally contains from about 0.5 to 9 percent by weight of additives selected from the group consisting of gums, emulsifiers, stabilizers, wetting agents, vitamins and flavorings.

8. An imitation milk composition according to claim 1 wherein the product is a powdered solid.

9. An imitation milk composition according to claim 1 wherein the product has been treated by agglomeration.

10. An imitation milk composition according to claim 1 wherein the fat is an edible animal fat derived from the bodies of animals.

11. An imitation milk composition according to claim 1 wherein the fat is an animal milk fat.

12. An imitation milk composition according to claim 11 wherein the fat is fat derived from cow's milk.

13. An imitation low-fat milk product according to claim 12 consisting essentially of about 48.5 percent sweet whey solids, 6.5 percent sodium caseinate, 27 percent corn syrup solids, 17 percent cow milk fat and 1 percent additives.

14. An imitation low fat milk liquid beverage comprising an aqueous dispersion of the composition defined in claim 13 containing 89 to 92 percent by weight water and 8 to 11 percent by weight solids.

15. An imitation skim milk product according to claim 12 consisting essentially of about 55 percent sweet whey solids, 7.5 percent sodium caseinate, 31.5 percent corn syrup, 5 percent cow milk fat and 1 percent additives.

16. An imitation skim milk beverage comprising an aqueous dispersion of the composition defined in claim 15 containing 89 to 92 percent by weight water and 8 to 11 percent by weight solids.

17. An imitation whole milk product according to claim 12 consisting essentially of about 41.0 percent sweet whey solids, 5.5 percent sodium, caseinate, 22.5 percent corn syrup solids, 30 percent cow milk fat and 1 percent additives.

18. An imitation whole milk beverage comprising an aqueous dispersion of the composition defined in claim 17 containing 89 to 92 percent by weight water and 8 to 11 percent by weight solids.

19. An imitatin milk liquid beverage comprising an aqueous dispersion of the composition defined in claim 1 containing 89 to 92 percent by weight water and 8 to 11 percent by weight solids.

20. An imitation milk beverage as defined in claim 19 which has been pasteurized and homogenized.

* * * * *